Figure 1:
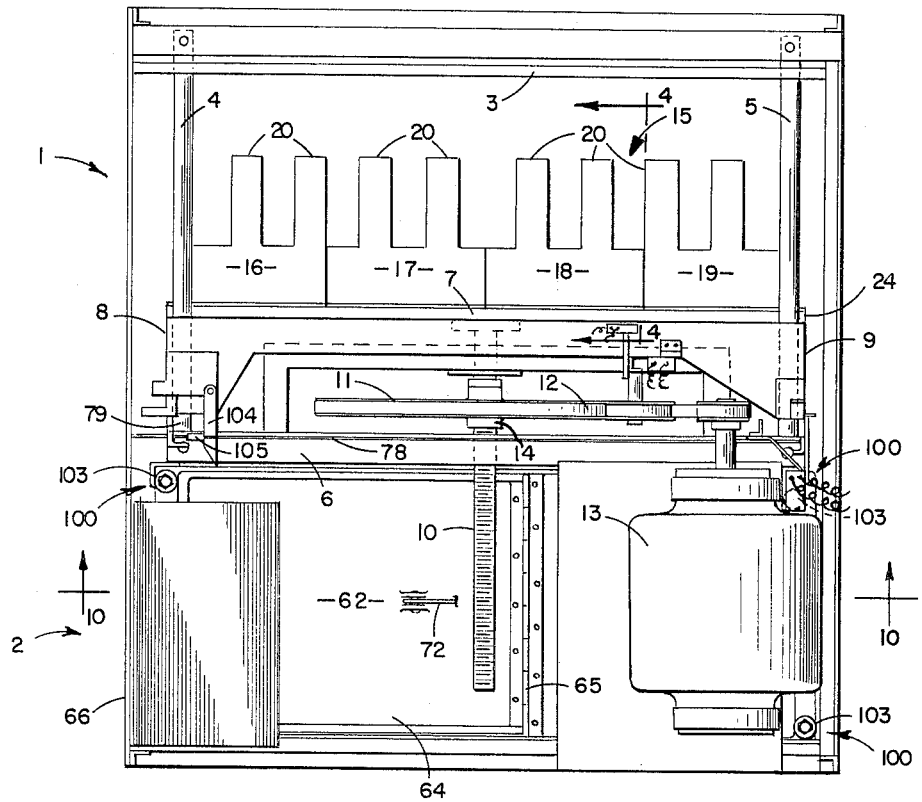

Feb. 1, 1966   A. A. SILESKI   3,232,220
REFUSE SEGREGATING AND COMPACTING DEVICE
Filed April 1, 1963   10 Sheets-Sheet 1

*INVENTOR.*
ALBERT A. SILESKI
BY
*Jansewitz & Carr*
ATTORNEYS

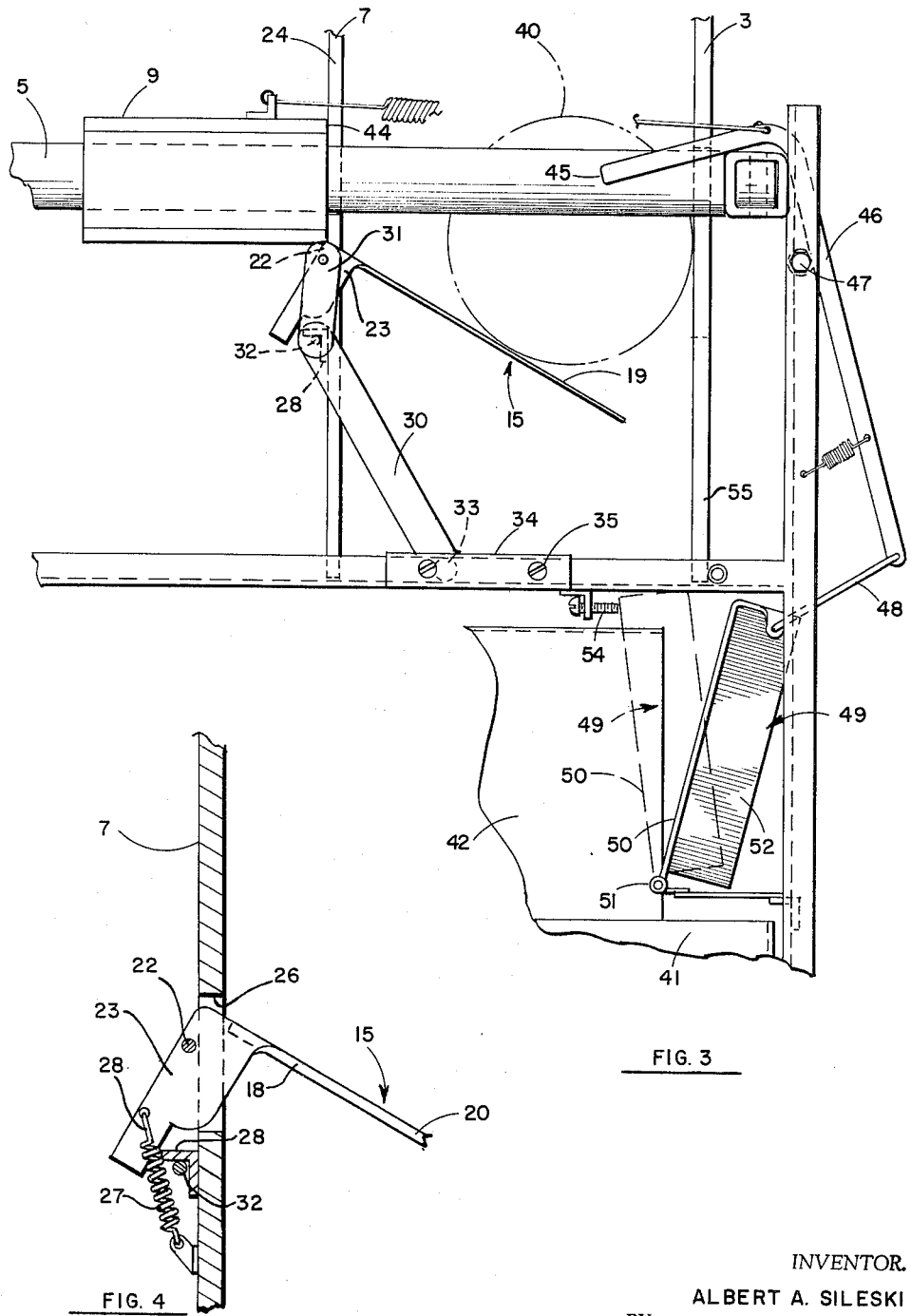

INVENTOR.
ALBERT A. SILESKI
BY
ATTORNEYS

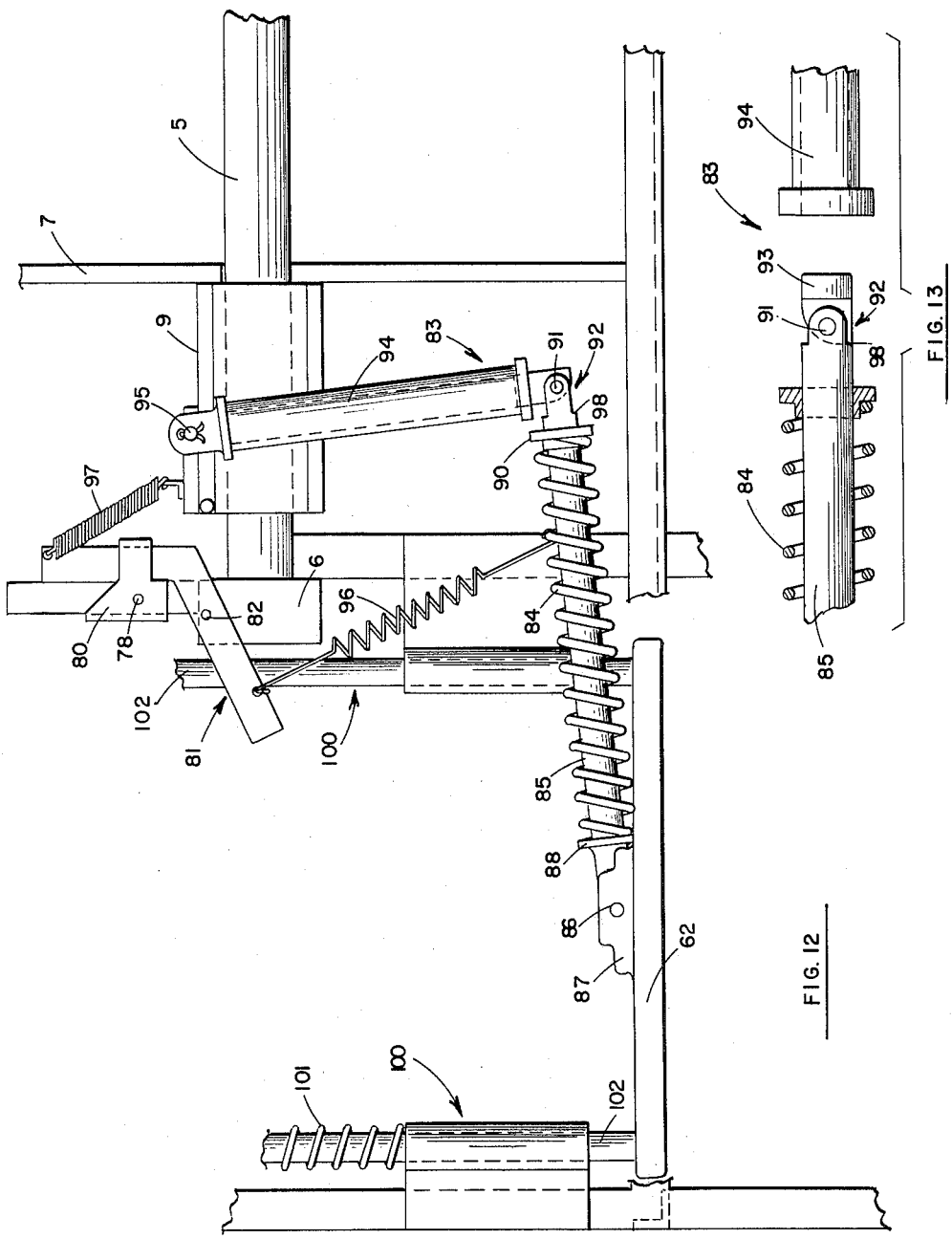

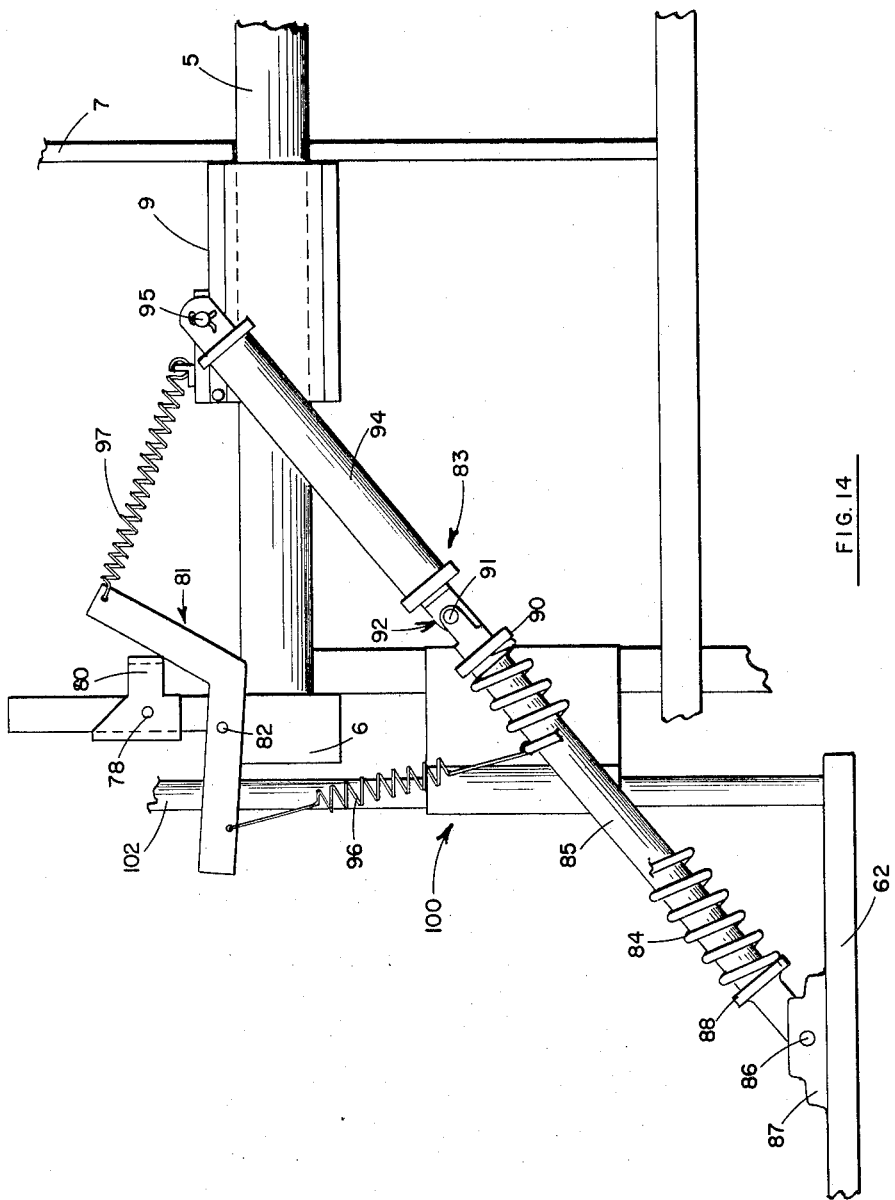

United States Patent Office 3,232,220
Patented Feb. 1, 1966

3,232,220
REFUSE SEGREGATING AND COMPACTING DEVICE
Albert A. Sileski, 5754 W. 75th St.,
Los Angeles 45, Calif.
Filed Apr. 1, 1963, Ser. No. 269,351
19 Claims. (Cl. 100—137)

This invention pertains to an arrangement for segregating and compacting various types of refuse.

In the past there have been numerous proposals for devices to compact rubbish. Generally, however, these designs have lacked versatility, being usable normally only to flatten cans. Normally, too, they have been incapable of dealing with refuse articles of different sizes at the same time. Thus, while it was known in the prior art that rubbish could be forced to occupy a smaller volume, the prior machines have been neither convenient in operation nor capable with handling many situations commonly encountered in rubbish disposal.

The present invention provides a machine that can be used for compacting and disposing of three basic types of rubbish. Cans and bottles are thrown in together, yet the machine automatically segregates these two types of articles. In addition, several different sizes of cans or bottles may be intermixed, yet all will be compacted properly by the machine. In general, the device of this invention includes a movable ram that can be forced through a stroke toward a plate against which the items of rubbish are flattened. A pivotal slotted flapper plate associated with the ram supports the items of rubbish and assists in centering them along the line of thrust. The flapper plate is segmented which permits items of various sizes to be flattened by the ram without dropping some as the compacting operation takes place. Glass items are fractured initially as the ram moves, and the fragments drop onto a ramp leading to one refuse container. The cans, on the other hand, are flattened subsequent to the breaking of the bottles and other glass members, and as the ram is retracted drop onto a second ramp which automatically is brought into position to direct the metal refuse to a second rubbish container. Soft rubbish such as paper is placed in another portion of the machine where there is a piston element that compacts such items. The piston is actuated by the same source of power used for cans and bottles, with an operating linkage being brought into play when the access door is closed on the section where the paper goods are inserted.

It is an object of this invention to provide a means for compacting refuse.

Another object of this invention is to provide for the compaction of refuse of various kinds.

A further object of this invention is to provide an arrangement wherein glass and metal refuse items may be thrown in together, yet which will be segregated upon compaction thereof.

An additional object of this invention is to provide a device which in one operation can compact refuse items of different sizes.

A still further object of this invention is to provide a single machine that is capable of compacting refuse of glass, metal and paper.

An additional object of this invention is to provide a rubbish compacting device that is convenient to use, reliable in operation, yet of relatively simple and economical construction.

Figure 11:
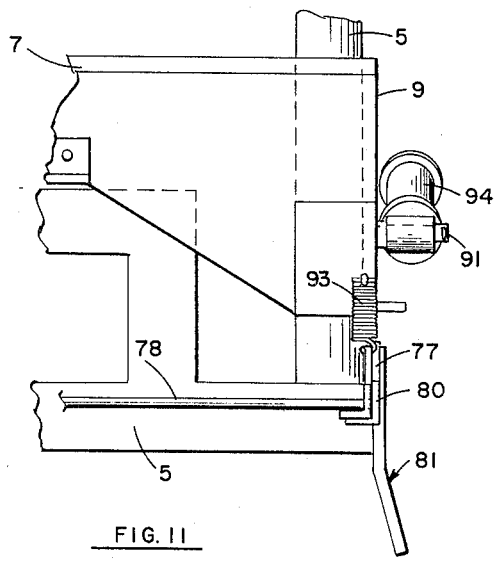
Figure 15:
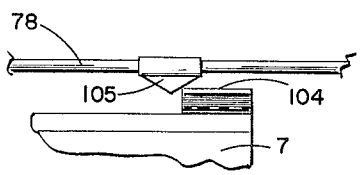
Figure 2:
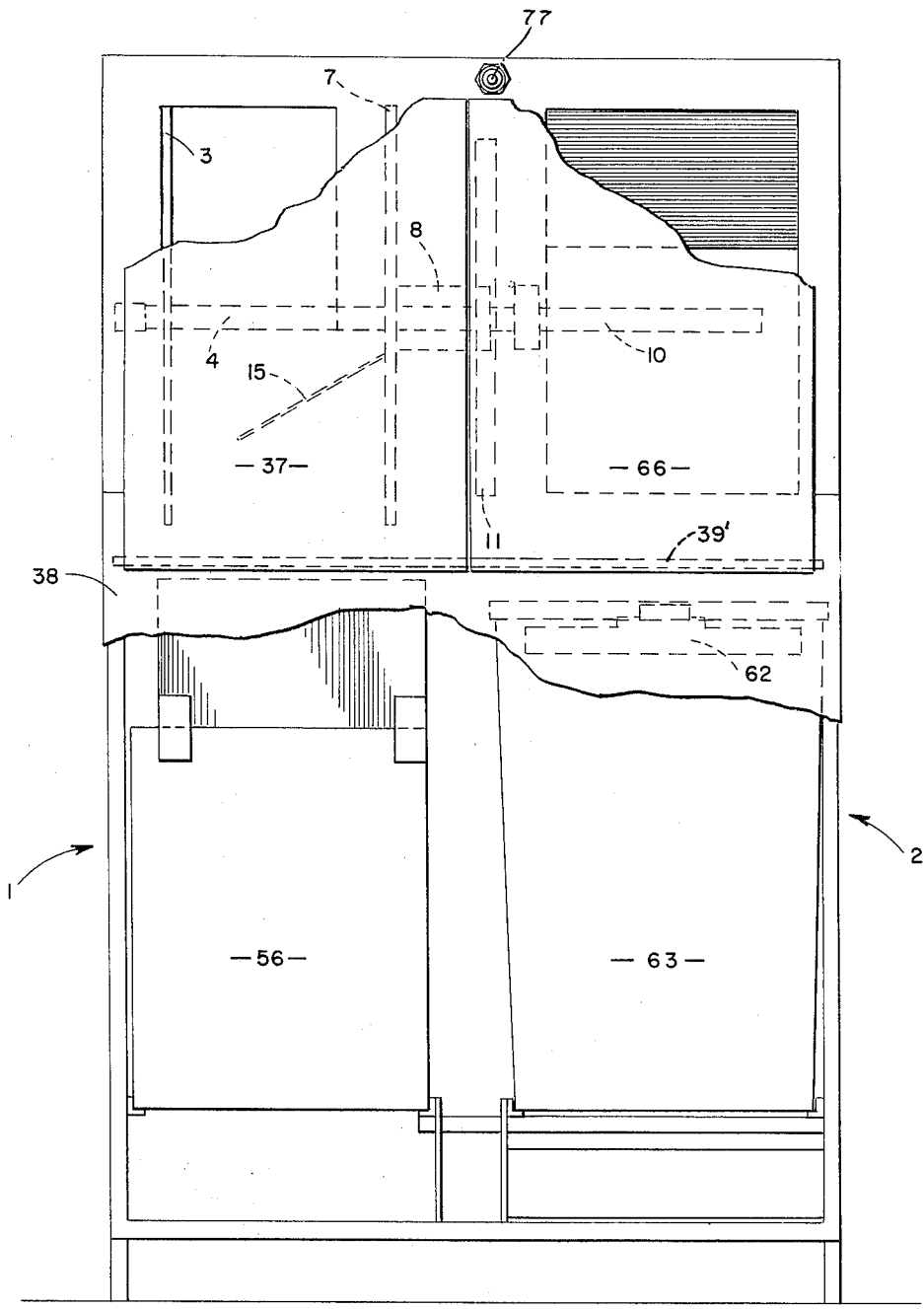
Figure 5:
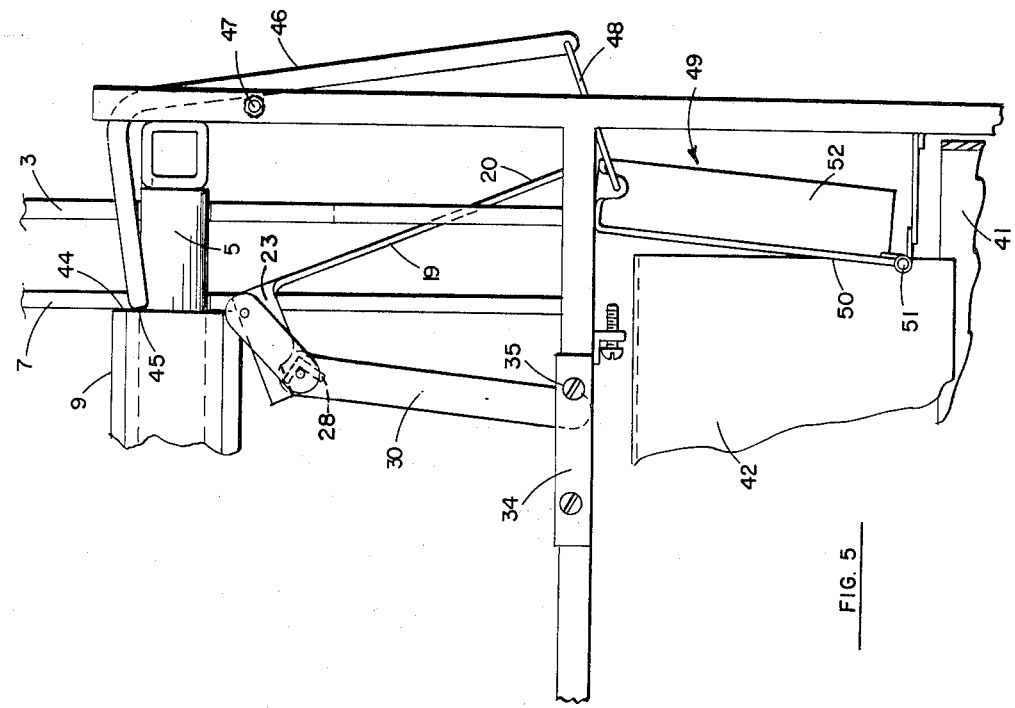
Figure 6:
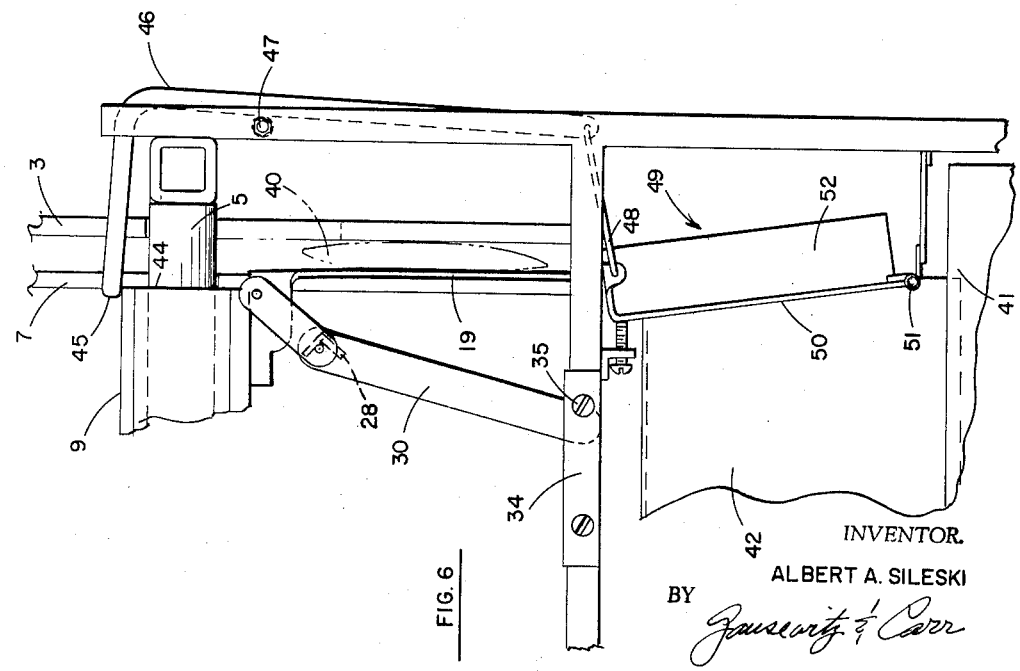
Figure 7:
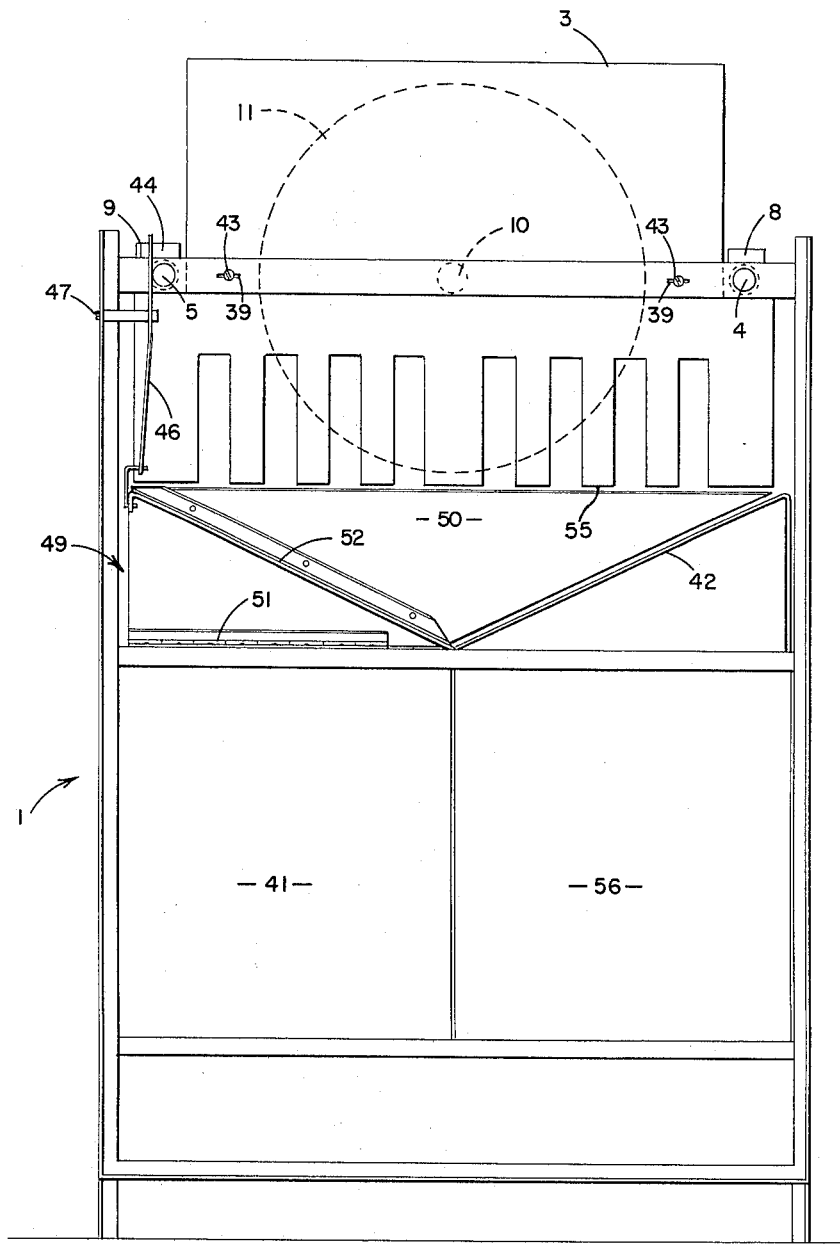
Figure 8:
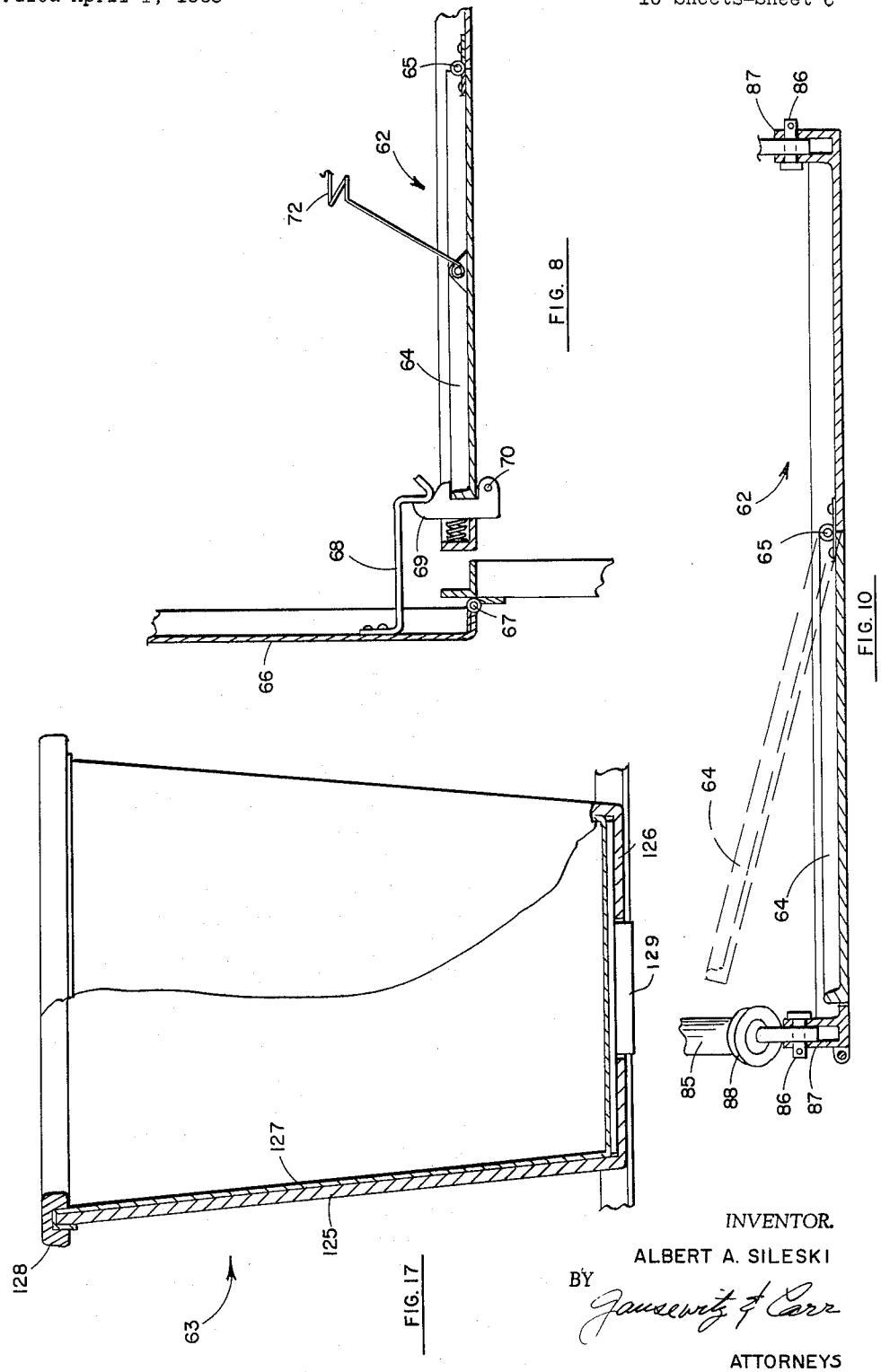
Figure 9:
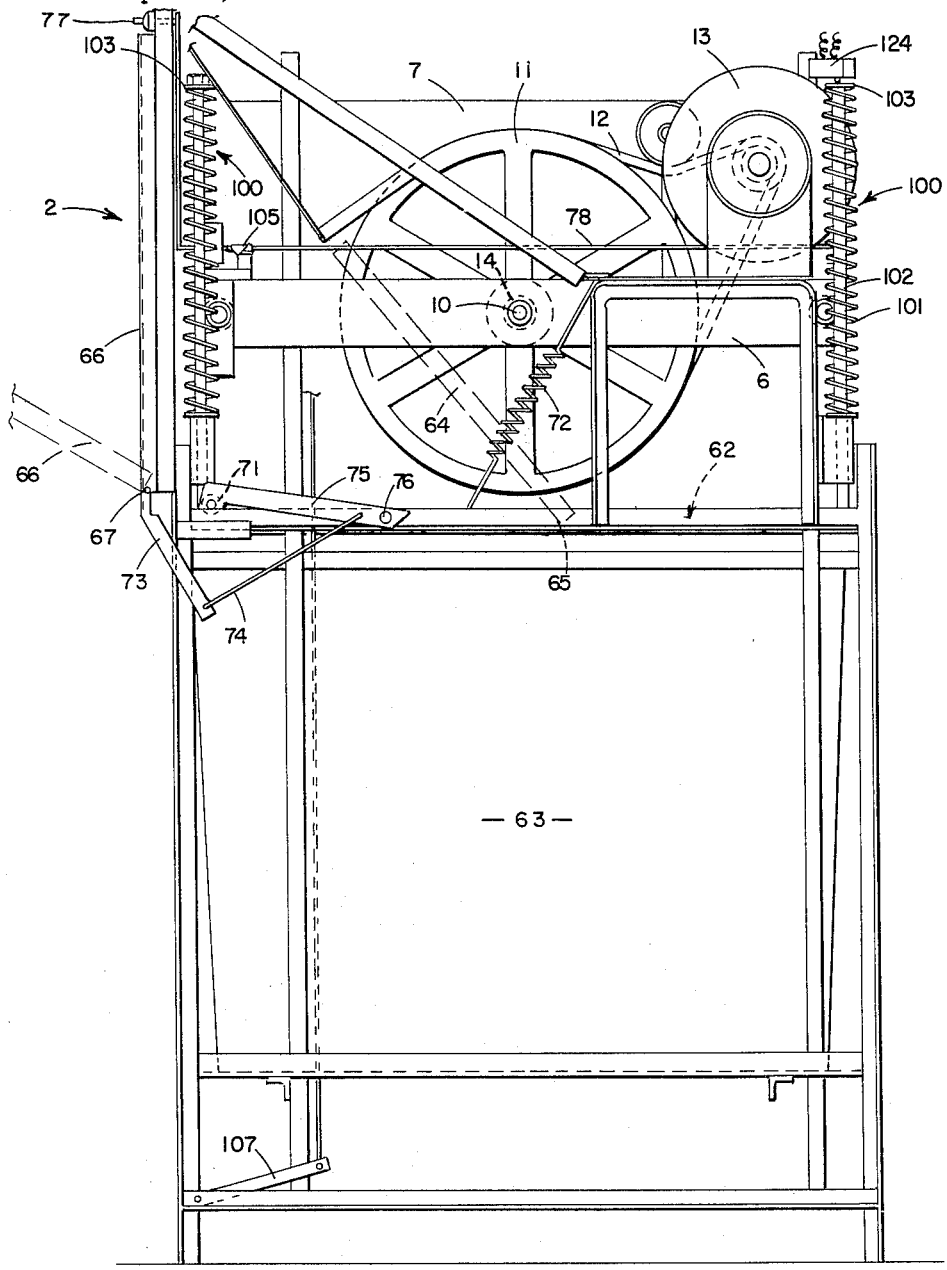
Figure 16:
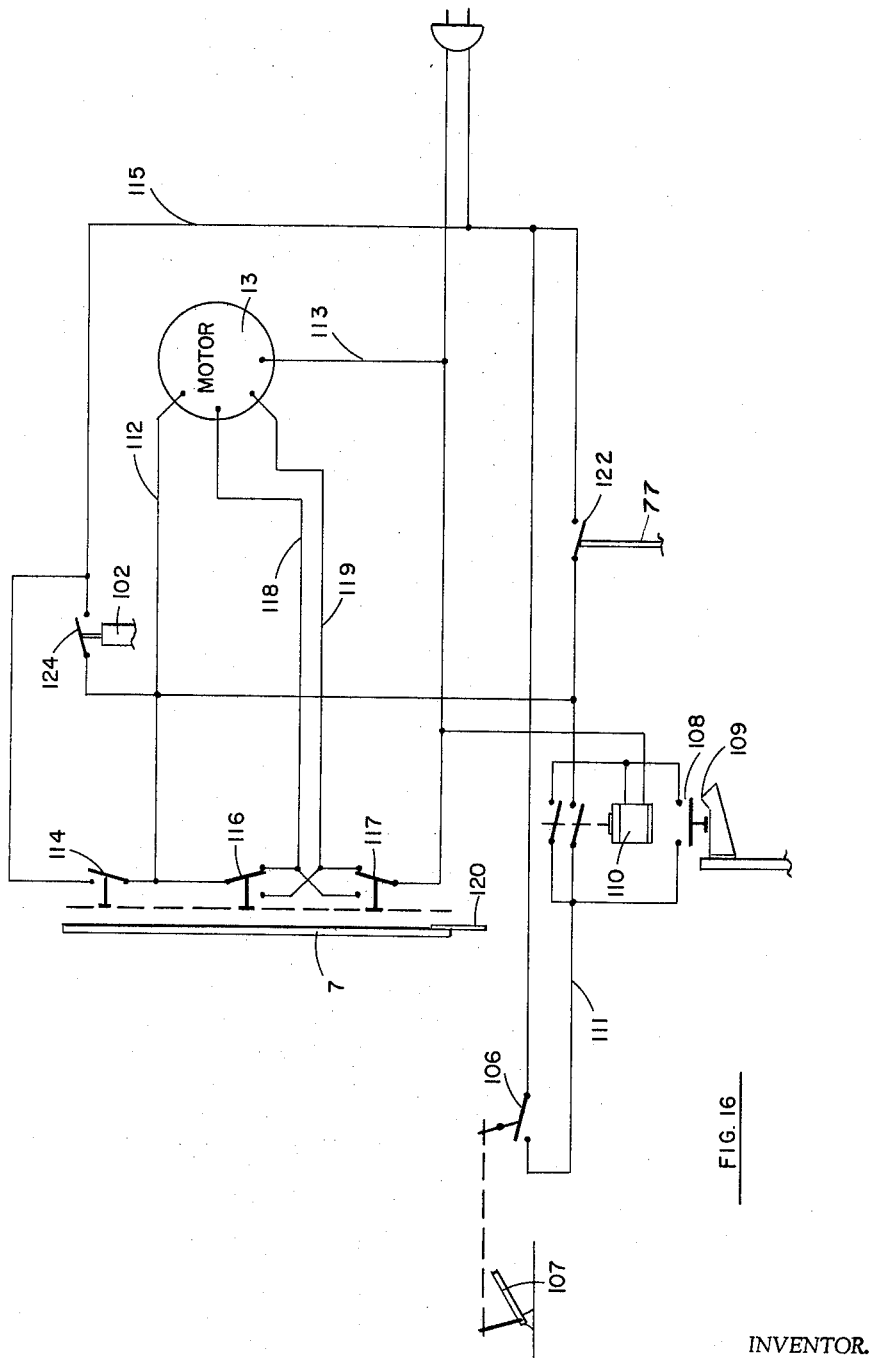

These and other objects will become apparent from the following detailed description taken in connection with the accompanying drawing in which:

FIGURE 1 is a top plan view of the rubbish compacting machine of this invention, FIGURE 2 is a side elevational view of the machine, FIGURE 3 is an enlarged fragmentary elevational view of the portion of the machine used in segregating and compacting glass and metal rubbish, with the ram in the retracted postion, FIGURE 4 is an enlarged fragmentary sectional view taken along line 4—4 of FIGURE 1 illustrating the mounting arrangement for the slotted plate that initially supports rubbish entering the machine, FIGURE 5 is an elevational view generally similar to FIGURE 3 but with the ram advanced through a portion of its stroke, FIGURE 6 is an elevational view similar to FIGURES 3 and 5 with the ram at the end of its stroke, FIGURE 7 is an end elevational view of the machine of this invention, FIGURE 8 is an enlarged fragmentary sectional view showing the means for latching and releasing a portion of the piston used in compacting soft rubbish, FIGURE 9 is an end elevational view of the machine, taken at the end opposite that of FIGURE 7 and with the exterior cover portions of the housing removed for clarity, FIGURE 10 is an enlarged fragmentary sectional view taken along line 10—10 of FIGURE 1 illustrating the piston construction, FIGURE 11 is an enlarged fragmentary plan view illustrating the detent arrangement for the linkage used in operating the piston, FIGURE 12 is an enlarged fragmentary elevational view of the piston actuating mechanism in the inoperative position, FIGURE 13 is an enlarged fragmentary elevational view, partially in section, showing the piston actuating linkage with the telescoping parts separated for clarity, FIGURE 14 is an elevational view similar to FIGURE 12 with the piston actuating members in the operative position, FIGURE 15 is an enlarged fragmentary elevational view of the means for returning the detents that latch the piston operating linkage in a retracted position, FIGURE 16 is a schematic diagram of the electrical system for operating the machine of this invention, and FIGURE 17 is an enlarged sectional view of the container for receiving the soft rubbish.

With references to the drawing, and in particular to FIGURES 1 and 2, the machine of this invention includes a section 1 for disposing of cans and bottles, as well as a second section 2 for the compacting of paper goods. At one end of the section 1 is a relatively heavy upstanding plate 3 against which the rubbish is compacted as the machine operates. A pair of spaced parallel horizontal guide rods 4 and 5 project from opposite sides of the plate 3 with their opposite ends being supported by the framework 6 of the machine. A movable ram plate 7 is parallel to the fixed plate 3 and carries sleeve bushings 8 and 9 at its opposite side edges. These bushings receive the rods 4 and 5 so that the ram assembly that includes the plate 7 and the bushings 8 and 9 that it carries is movable rectilinearly toward and away from the fixed plate 3. Such movement may be imparted in any suitable manner, such as by means of the feed screw 10 advanced by a pulley 11. The latter element through belt 12 is rotated by electric motor 13. The screw 10 is attached to the plate 7 so that it does not rotate, and passes through a nut 14 at the hub of pulley 11. Therefore, when the pulley 11 rotates, the screw 10 is moved axially to impart movement to the plate 7.

On the forward side of ram plate 7 is a flapper or finger plate assembly 15. This includes a plurality of individual relatively light sheet elements, such as the four members 16, 17, 18 and 19 illustrated. Each of these segments includes a recessed bottom edge to define a plurality of relatively long fingers 20.

The mounting arrangement for the finger plate assembly 15 may best be seen by reference to FIGURES 3 and 4. A shaft 22 is fixed to the back surface of the plate 7 extending across it from one side to the other. The finger plate segments are pivotally supported by this rod. The attachment to the shaft 22 is accomplished by a pair of arms 23 that extend rearwardly from the top of each of the finger plate units. As seen in FIGURE 3 one arm 23 of the end segment 19 extends past the side edge 24 of the ram plate 7, while the other arm 23 passes through a slot 26 formed in the ram. This slot also accommodates the arm 23 of the next adjacent finger plate segment 18 (see FIGURE 4). There are two additional slots 26 to allow the arms for all of the segments 16, 17 and 18 to extend through the ram plate. These arms are apertured to receive the pivot shaft 22 and accomplish the pivotal mounting. The finger plate elements are spring loaded in a suitable manner, such as by tension springs 27, in a counterclockwise direction as illustrated in FIGURE 3. In other words, the finger plate segments are biased to a raised position where they project forwardly from the lower portion of the ram plate 7.

The distal ends of the arms 23 are notched on their lower edges where they engage the upper edge of a transverse bar 28 that also extends across the rear side of the ram plate 7. The bar 28 is caused to move vertically as the ram plate is moved. This is accomplished by a linkage as shown in FIGURES 3, 5 and 6 that includes a push rod 30 and a shorter link 31, both of which pivotally engage pin 32 that extends outwardly from the bar 28. The opposite end of the link 31 pivotally connects to the rod 22 which mounts the finger plate segments. The other end of rod 30 includes a roller 33 and is received in a guide channel 34. A similar linkage is included at the opposite side of the plate 7.

In operation of the invention, therefore, motor 13 through the drive pulley 11 can advance the ram plate 7 along the path defined by the guide rods 4 and 5. As this movement takes place, the roller 33 of the push rod 30 ultimately is brought into contact with a stop 35 at the end of channel 34. When this occurs the rod 30 is pivoted forwardly (clockwise in FIGURES 3, 5 and 6) toward a vertical position. This causes the upper end of the rod to become elevated, thereby pushing upwardly on the pin 32 and hence raising the bar 28. The bar 28 then reacts against the ends of the arm 23 causing the finger bar assembly 15 to pivot downwardly.

It should be noted that while the various sections of the finger plate assembly are moved together by the bar 28, they are also capable of additional rotational movement independent of the position of rod 28. In other words, an exterior force on any of the finger bar segments can cause it to pivot downwardly more rapidly than required by the gradual upward movement of the cross bar 28.

In the compacting of rubbish with the machine of this invention door 37 of the housing 38 is pivoted downwardly about a hinge 39' at its lower edge, thereby providing access to the area in front of the retracted ram plate 7. Refuse then is thrown into this zone where it will come to rest upon and be supported by the segmented finger plate assembly 15. This refuse may constitute glass bottles and jars as well as metal articles such as tin cans. Then with the door 37 closed, the motor 13 is started, as will be made more clear hereinafter, causing the flywheel to rotate and advance the plate 7 toward the stationary plate 3. As the ram and the finger plate assembly approach the stationary rear plate 3, the refuse is caused to roll up the inclined plane of the finger assembly. This raises the refuse items, positioning them closer to the line of thrust along the axes of the drive pulley 11 and the guide bars 4 and 5. With continued translational movement, when the article of rubbish, such as the item 40 illustrated, has hit the ram plate 7 it will begin to force downwardly the finger plate segment upon which it rests. This movement is permitted by the pivotal mounting of the finger plate unit on the shaft 22 at the rear side of ram plate 7. This also allows the finger plate segments to be rotated downwardly unevenly. Hence, if there is a large diameter item on the segment 19 that portion may rotate downwardly ahead of the adjacent section 18 which is moved only by the upward progress of the bar 28.

As the ram 7 advances, it will of course begin to compress the refuse item 40 which is trapped between the ram and the stationary plate 3. If the item 40 should be of glass, it will be shattered by this movement upon little compression by the ram plate. Metal items such as cans, however, naturally will remain intact throughout the stroke of the plate 7. When the glass refuse items are broken between the two plates, they will thereby be freed from the ram and stationary plate and will drop downwardly.

Beneath the section 1 of the machine and on one side of the centerline of the machine, such as beneath finger sections 18 and 19, there is an open container 41. Hence, if a glass item is positioned over the open upper side of the container 41 it will drop directly through the open portions of the plates 18 and 19 into this container prior to the time that the ram 7 reaches the end of its stroke. This is regardless of the fact that there may be metal items that the ram is continuing to compress as the stroke proceeds.

On infrequent occasions it is possible for a particularly heavy glass segment to become lodged between plates 7 and 3 and aligned with the path of movement of the ram. As such it will present a strong column resisting the ram movement and very difficult to fracture in the manner loaded. However, the plate 3 may float laterally a small amount which allows it to shift to one side and upset the fragment between the two plates. This floating movement may be provided by the inclusion of slots 39 where the plate 3 is secured by bolts 43 to the frame of the machine. With the heavy glass particle no longer column loaded it will be broken without difficulty.

On the other side of the centerline of the machine between the ram and fixed plate 7 there is an inclined ramp 42 that has its lower horizontal edge adjacent the upper side of the open container 41. Hence, if the glass article should be above finger segments 16 and 17, it will, upon being shattered, drop down through these slotted members onto the ramp and slide into the container 41.

It can be seen, therefore, that all of the glass articles regardless of which side of the center of the machine they may be located on, will be broken prior to the time that the ram reaches the end of its stroke and will fall into the container 41. The ramp in effect defines a portion of the entrance into container 41, directing the small glass rubbish particles into the interior of the container 41. At the same time the metal refuse articles will be retained above in one piece and will not drop through to the glass receptacle 41.

As the ram 7 continues through its stroke, the forward edge 44 of the bearing housing 9 engages the end 45 of a bell crank 46. The latter member is secured by pivot pin 47 to the framework of the machine. The opposite end of bell crank 46 pivotally connects to a link 48, which in turn engages a trough unit 49. This latter element includes an upstanding plate 50 pivoted about horizontal hinge 51 at its lower edge. The hinge 51 is located at right angles to the line of movement of the ram, and hence is parallel to the ram plate. The trough unit incorporates a deflector that is defined by a flange 52 which projects outwardly from the plate 50 on the rear side of the machine. The bell crank 46 is suitably spring loaded in a counterclockwise direction as viewed in FIGURES 3, 5 and 6.

When the shoulder 44 of the ram plate unit engages the end 45 of the bell crank 46, it causes this member to pivot in a clockwise direction. This, through rod 48, causes the trough unit 49 to rotate in a counterclockwise direction about its hinge 51. As a result, the sheet 50 is pivoted from a position where it was to the rear of the fixed plate 3 to an alternate position where it is forward of this plate and engaged with adjustable stop 54. This locates the flange 52 beneath and forward of the end plate 3 of the machine.

As the ram plate 7 is advanced by the motor it continues to compress the cans against the end plate 3 as it approaches that element. Any smaller cans are held by the segmented finger units regardless of the fact that there may be some larger items present that are deformed prior to the deformation of the smaller pieces of refuse. The ram plate 7 continues in its movement until it is adjacent the end plate 3 in the position seen in FIGURE 6. The plate 3 is appropriately slotted at its lower part 55 to allow portions of the assembly 15 which are not fully depressed to extend through it as the ram moves to the end of its stroke.

At this point the ram plate 7 is reversed and travels back to its original position. One means of accomplishing this is for the motor 13 to be of the reversing type that will be caused to rotate in the opposite direction automatically when stalled out by the increased resisting force encountered as the plate 7 is brought against the plate 3.

As the ram plate 7 moves away from the plate 3, upon reversal of the motor 13, the flattened metal refuse is released by the two plates and drops downwardly. At this time the finger plate assembly is held downwardly against the part of ram 7 by the upwardly moved cross bar 28. This is to allow the metal items to fall downwardly and no longer be supported by the unit 15.

The portion of the metal refuse over open-topped container 56 simply will fall into that receptacle. The other part of the flattened metal items, which may be located above the container 41, falls onto flange 52. This provides an inclined ramp that directs the metal refuse into the receptacle 56. Only a narrow element is needed to accomplish this in view of the flattened nature of the rubbish at this point. Thus the metal refuse, regardless of its lateral position within the compacting area of the machine, will be caused to fall into the container 56 rather than the receptacle 41 that is for glass.

Consequently, it can be seen that the device of this invention automatically segregates the glass and metal refuse. The glass is initially shattered prior to the full compaction of the metal elements and drops directly into the container 41, or is deflected into that container by means of inclined ramp 42. The metal refuse on the other hand, either falls directly into the receptacle 56, or through the automatically operated deflector unit 49 is caused to enter the receptacle 56.

When the plate 7 returns to its original position it contacts a switch which turns off the motor and stops the unit, as will be described more fully below. Also, as the ram reaches its retracted position, the deflector unit 49 is released by shoulder 44 and the moving parts are returned to their original locations by the spring on bell crank 46.

The portion 2 of the machine for disposing of soft rubbish includes a piston assembly 62 that is adapted to move vertically with respect to a container 63 beneath it that forms in effect a cylinder. A portion of the piston assembly 62 comprises a lid 64 which is pivotally secured to the remainder of the piston unit by a hinge 65. Access to the section 2 of the unit is through a door 66 that is hinged to the framework of the machine at its bottom edge 67. When the door 66 is opened it causes spring clips 68 at the lower edge of the door to pivot spring loaded latches 69 on shaft 70 so as to move outwardly away from the edge of lid 64 (see FIGURE 8). This releases the lid 64 and allows spring 72 to pivot the lid to an open position, as seen in phantom in FIGURE 9. Therefore, as access door 66 is opened, the lid 64 likewise is raised and rubbish may be thrown into the container 63.

Upon closing door 66, crank arm 73 at the bottom edge of the door pulls downwardly on link 74 that is connected to arm 75. The latter member is pivoted to the framework about pin 76 and at its outer end carries a roller 71 that overlaps and engages the upper surface of lid 64. Therefore, as door 66 is closed, arm 75 rotates downwardly to close the lid 64. This enables the spring loaded latches 69 to secure the lid in place upon closing of the access door.

With the door closed, button 77 is pushed inwardly which in turn causes a rod 78 to move through a short stroke, to the right as seen in FIGURE 9, by reacting against the upstanding end part of this rod seen next to the door 66 in this figure. This causes sliding movement of the rod 78. The rod 78 carries with it two detents 79 and 80. These two members normally hook over the upper portions of bell cranks 81. The latter elements are pivoted to the framework of the machine by the pins 82 as seen in FIGURE 12. Upon movement of rod 78 inwardly the detents 79 and 80 are shifted laterally so that they no longer interfere with the cranks 81 which then are free to rotate about their pivotal mountings.

When the motor 13 is started, which may be accomplished by closing a switch upon movement of button 77, and the plate 7 advances toward the end of its stroke in the cycle for compacting soft rubbish, the initial movement is simply to bring the operative members for the piston 62 into position to actuate the piston. The means for operating the piston includes a pair of link assemblies 83. Each of these includes a relatively heavy compression spring 84 that receives a rod 85 one end of which through pivot pin 86 connects to bracket 87 on the upper surface of the piston 62. The lower end of spring 84 engages the flange 88 carried on the lower end of rod 85 while the opposite end of spring 84 bears against washer element 90 that is slidable along the rod. The rod 85 connects by pin 91 to fitting 92 having a short cylindrical disc portion 93. Tube 94 normally receives the disc 93, and at its upper end by pin 95 is connected to bushing housing 9.

A lighter spring 96 extends from the compression spring 84 to the lower end of the crank 81. An additional spring 97 interconnects the upper end of crank 81 and the bearing housing 9 of the movable plate assembly 7.

As a result of this construction, as the ram plate is advanced through its stroke, crank 81 is caused to rotate clockwise in the view of FIGURE 12 by virtue of the movement of spring 97 that moves with the ram. This causes spring 96 to raise the linkage assembly 83 to the position of FIGURE 14. By the time the ram plate has reached the end of its stroke, the linkage 83 will be raised to a position where the tube 94 is aligned with rod 85. The linkage cannot pivot too far over center because of shoulder 98 on fitting 92 that contacts the inner wall of the bifurcated end of rod 85 (see FIGURE 13). Consequently, the linkage 83 forms in effect a straight push rod between the movable ram element 7 and the top of the piston 62.

At the end of the stroke of the ram plate 7 the motor will reverse as before, causing the ram to return to its original position. As this takes place, the two link assemblies 83 will bear downwardly on the piston 62 so that it moves vertically into the soft rubbish container 63. Hence, as the ram unit 7 is brought back to its original position the piston 62 will cause refuse within the container 63 to be compacted.

It should be observed that as the links 83 force the piston 62 against the rubbish, the force is applied through the compression springs 84 rather than through a rigid member. Therefore, if there should be a large amount of rubbish in the container 63, the compression spring 84 merely will be compressed and the piston 62 will not travel quite as far as it would if a lesser amount of refuse were present. Hence, rubbish can be compacted in the section 2 of the machine, regardless of the quantity thrown in at one time or the amount which may be present at the bottom of the unit from previous cycles of operation of the machine. The exercise of the compacting force through the springs 84 adds to the capacity of the machine, and assures that the force of compaction will not damage the components of the machine.

After the ram unit 7 has been returned to its original position and the rubbish compacted by the piston 62, the ram is extended again to the end of its stroke freeing the piston 62 from the downward force by the linkage unit 83. Consequently, the piston 62 then is raised by the spring units 100. Each of these includes a compression spring 101 the bottom end of which rests upon a fixed portion of the machine. A rod 102 within the spring is connected to the piston 62. A flange 103 at the upward end of the rod 102 engages the top end of the compression spring. Therefore, when the piston unit is released by the link assemblies 83 the springs 101 bear upwardly against flanges 103 and cause the rods 102 to raise the piston.

When the ram 7 makes its second stroke to the end of the machine adjacent plate 3, the linkage units 83 drop downwardly to their original position and are no longer held with their links in alignment by the cranks 81. This is because the detents 79 and 80 are returned to their original position as the ram 7 completes its first cycle. This is accomplished by means of a cam 104 carried by the ram assembly that contacts follower 105 on the rod 78. The cam and follower, therefore, move the rod 78 to the left from the views of FIGURES 9 and 15, returning the detents 79 and 80 to the position where they hook over the cranks 81 and prevent rotation thereof. Accordingly, when the ram unit 7 completes its second cycle of movement all components of the machine are returned to their original positions. Therefore, the machine is ready again for compacting either hard or soft rubbish in the section 1 or 2 of the machine.

The electrical arrangement for causing the operation of the machine described above may be seen by reference to the wiring diagram of FIGURE 16. In initiating the cycle for compacting hard rubbish in the section 1 of the machine, toggle switch 106 initially is closed. This may be done by a mechanical linkage to a treadle 107 which connects to the door 37 for providing access through the housing to the area 1 between the ram and the fixed plate. Next, the switch 108 is closed which may be accomplished by a cam 109 carried by the door 37. Although closed only for an instant as the door is shut, holding coil 110 maintains the circuit through conductor 111. Hence, the circuit is completed through conductors 112 and 113 to the motor 13, causing the motor to start advancing the ram plate toward the fixed plate 3. As the ram plate moves away from its retracted position, it releases normally closed switch 114 so that there is now a current path through conductor 115 to the motor. This also throws switches 116 and 117 that through leads 118 and 119 are connected to the starting coil of the motor. This reverses the connections to the starting coil for subsequent reverse movement of the plate 7.

As the plate 7 continues in its movement, a depending leaf spring 120 on the ram trips the toggle switch 106 to the open position. This causes the holding relay 110 to drop out and opens the circuit in line 111. When the ram reaches the end of its stroke it stalls the motor which then immediately restarts in the reverse direction. This returns the ram to the retracted position where it opens switch 114 cutting off the circuit through motor 13 and ending the movement of the ram. This also trips switches 116 and 117 to return them to their original positions so that when the motor is restarted the cycle can be repeated.

For compacting paper goods in the section 2 of the machine, normally open switch 122 is closed to provide a current path to the motor, starting the motor to move the ram toward the fixed plate 3. Switch 122 may be tripped by movement of access door 66 such as by being positioned for actuation by the rod 78 that also releases the cranks 81 and hence the piston-actuating linkage units 83. Again as the plate 7 moves away from the retracted position, the switches 116 and 117 are tripped to change the connection to the motor starting coil. Also, normally closed switch 114 can assume the closed position as the ram moves away from its retracted position. The ram 7 then travels to the end of its stroke as before where it stalls and reverses to return the plate 7 to the right. This return movement of the ram 7, however, moves piston 62 downwardly in compacting the soft goods in the container 63. This downward movement causes one of the rods 102, which travels with piston 62, to move away from and release normally closed switch 124. With the switch 124 closed, there is an additional path for current to the motor 13. Hence, when the plate 7 reaches its retracted position opening the switch 114, the motor 13 is not turned off. This retraction of the ram 7 again trips the switches 116 and 117 which reverse the connections to the starting coil of the motor causing the motor to change its direction of rotation and again move the ram 7 toward the end of its stroke. This means that as plate 7 moves again toward the fixed plate 3, the switches 116 and 117 are tripped to enable the motor to reverse the ram at the end of its stroke. Also, as pointed out above, the cam 104 strokes follower 105 to move rod 78 back to its original position. This allows switch 122 to open. Moreover, this movement of the rod permits the piston 62 to be raised to its upper position by the springs 101 where rod 102 opens the switch 124. Accordingly, when the ram 7 again returns to its initial position opening the switch 114, the current to the motor is interrupted and the cycle stops.

Use of the machine of this invention is facilitated by providing the rubbish receiving containers 41, 56 and 63 with removable liners. Hence, to empty the machine it is necessary only to take out the liners, which may be made of relatively heavy paper and are expendable in nature. The liners may act as the rubbish receptacles when the trash is picked up. Preferably the container 63 is constructed with a slight draft to its side walls as seen in FIGURE 17. With the sides 125 tapering to the bottom 126 the liner 127 will not become tightly wedged within the container, and therefore can be removed readily. Also, center block 129 extends below wall 126 of the container 123, and when the container is removed from the machine can engage the supporting surface. Consequently, the liner is held upwardly by the block 129 while the container 63 can be moved downwardly to loosen liner 127. A removable rim 128 may be employed to hold the upper edge of the receptacle 127 in place while the container is within the machine.

From the foregoing it can be seen that I have provided a rubbish sorting and compacting device that attends to virtually all problems attendant the disposal of glass and metal refuse. Its operation is automatic, yet the same components of the machine operate generally for accomplishing several different functions.

The foregoing detailed description is to be clearly understood as given by way of illustration and example only, the spirit and scope of this invention being limited solely by the appended claims.

I claim:

1. A rubbish segregating and compacting device comprising
    a fixed abutment, a ram movable toward and away from said abutment, means for causing such movement of said ram, support means for holding rubbish items between said ram and abutment when said ram is remote from said abutment, a first container means,
 said first container means having an opening beneath said suport means covering a portion of the space between said ram and abutment for receiving items of rubbish fractured between said ram and abutment, a second container means,
 said second container means having an opening communicating with and located beneath other portions of the space between said ram and said abutment, said other portions being adjacent said abutment, baffle means movable over a portion of said first mentioned space, and means operatively connected to said ram to so move said baffle means when said ram is adjacent said abutment for deflecting additional items or rubbish into said second container.

2. A device as recited in claim 1 in which said opening in said first container includes a first inlet portion beneath one side of said space, and a baffle beneath the other side of said space
 said baffle being inclined for directing rubbish by gravity into said first receptacle.

3. A rubbish segregating and compacting device comprising
 a fixed abutment,
 a ram,
 said ram being movable through a stroke from a position remote from said abutment to a position of adjacency therewith, means for moving said ram through said stroke,
 a support beneath the space between said ram and abutment for supporting articles of rubbish therebetween, means connecting said support to said ram for movement therewith,
 said support having aperture means therethrough for permitting relatively small rubbish particles to drop downwardly,
 said support being movable to a position remote from said space to allow relatively larger particles of rubbish to drop downwardly,
 a first container,
 said first container having an opening extending over substantially the entire lateral dimension of said space,
 a second container,
 said second container having an opening,
 guide means, and means for moving said guide means over a portion of said space adjacent said abutment when said ram is adjacent said abutment for directing rubbish into said opening in said second container.

4. A device as recited in claim 3 in which said guide means for directing rubbish into said second container includes a trough
 pivotal to a position where open portions of said trough are beneath said abutment and on the side thereof adjacent said ram,
 and including means for effecting such pivotal movement of said trough when said ram is adjacent said abutment.

5. A device as recited in claim 3 in which said support is pivotally carried by said ram.

6. A device as recited in claim 3 in which said support comprises a plurality of segments individually pivotal relative to said ram.

7. A device as recited in claim 6 including in addition means for simultaneously pivoting said segments of said support relative to said ram so as to open the space beneath said ram during movement of said ram towards said abutment,
 said segments being individually pivotal toward said ram in response to force exerted thereon by rubbish supported thereby.

8. A device as recited in claim 3 including in addition a fixed cylinder adjacent said containers,
a piston movable in said cylinder for compacting rubbish in said cylinder,
and means selectively operatively connecting said ram and said piston for causing said ram to so move said piston in said cylinder.

9. A device as recited in claim 8 in which said means for operatively connecting said ram and said piston comprises link means,
 said link means including at least one link pivotally connected to said ram,
 and a second link pivotally connected to said piston,
 said links having adjacent ends pivotally interconnected,
 said links being movable to an aligned position by movement of said ram
 whereby in said aligned position said links can exert an operative force on said piston.

10. A device as recited in claim 9 in which said links include means for resiliently applying force to said piston,
 whereby said piston is movable through strokes of varying lengths as determined by the resisting force on said piston in opposition to said resilient means.

11. A device as recited in claim 8 in which said means for operatively connecting said ram and said piston includes at least one elongated member one end of which is pivotally connected to said piston,
a second elongated member one end of which is pivotally connected to said ram,
a relatively short member pivotally connected to the opposite end of said one of said elongated members,
 said second elongated member having an aperture therein slidably receiving said relatively short member,
 said one elongated member being slidably receivable in said aperture when said elongated members are substantially in alignment,
a helical compression spring means receiving said one elongated member,
 one end of said spring means being engageable with the end of said second elongated member when said elongated members are substantially in alignment,
 and the opposite end of said spring means being axially fixed with respect to said one elongated member,
 whereby upon movement of said ram in one direction said elongated members telescope when in said substantial alignment and said second elongated member exerts a compressive force on said spring means for exerting a corresponding resilient force on said piston.

12. A device as recited in claim 11 including in addition means for selectively moving said elongated members into substantial alignment upon movement of said ram toward said fixed abutment.

13. A rubbish segregating and compacting device comprising
 a fixed plate,
 a ram movable through a stroke toward and away from said fixed plate, means for moving said ram through said stroke,
 a first container having an opening beneath a portion of the space between said ram and a location in juxtaposition with said fixed plate, a baffle over remaining portions of said space,
   said baffle being positioned to define a guide path for deflecting refuse into said first container,
a second container
   having an opening at said location in juxtaposition with said fixed plate,
a second baffle,
and means operable by said ram for positioning said second baffle over portions of said opening in said first container and of said first baffle upon movement of said ram to a position of adjacency with said fixed plate,
   whereby said second baffle serves to divert refuse into said second container.

14. A rubbish segregating and compacting device comprising
a fixed plate,
a ram,
   said ram being movable through a stroke toward and away from said fixed plate, means for moving said ram through said stroke,
an apertured member carried by said ram and extending forwardly therefrom for receiving and supporting refuse disposed in the area between said ram and said fixed plate,
   said apertured member being movable toward a retracted position of adjacency with said ram,
a first container,
means for deflecting shattered refuse into said first container when said ram is remote from said fixed plate,
a second container,
and means for deflecting compacted refuse into said second container when said ram is in juxtaposition with said fixed plate.

15. A device as recited in claim 14 in which
said apertured member is segmented,
   each segment of said apertured member being independently movable downwardly toward a position of alignment with said ram, said ram being substantially vertically disposed.

16. A device for reducing the volume of refuse comprising
a first fixed upstanding plate,
a second upstanding plate,
power means for moving said second plate toward and away from said first plate,
a third plate carried by said second plate,
   said third plate extending downwardly and forwardly from said first plate and being pivotal relative to said first plate,
   said third plate including apertures therethrough providing access to the space beneath and between said first and second plates,
a first receptacle beneath said plates,
   said receptacle having an opening on one side of said space,
a baffle between said plates on the other side of said space for deflecting refuse into said first receptacle,
   said baffle extending to an edge adjacent but horizontally spaced from said first plate,
a second receptacle,
   said second receptacle having an opening adjacent said first plate beyond said edge of said baffle,
a second baffle for deflecting refuse into said second receptacle,
   and including means operable by said second plate for moving said second baffle to a position over portions of said opening in said first receptacle and over portions of said first baffle when said second plate is adjacent said first plate.

17. A device as recited in claim 16 in which
said third plate is segmented,
   each of the segments of said third plate being pivotal relative to said second plate independent of the other segments.

18. A device as recited in claim 16 in which
for moving said second plate toward and away from said first plate there is included a pair of spaced parallel guide bars extending between said plates at opposite side edges thereof,
   said second plate including bearing means engaging said guide bars,
and said power means includes an actuator engaging said second plate intermediate said guide bars for moving said second plate along the path defined by said guide bars, 19. A device as recited in claim 16 including in addition
a third receptacle,
and a pressure member reciprocative in said third receptacle,
   said pressure member being connected to said second plate,
   and selectively movable by said second plate through a stroke in said third receptacle for compacting rubbish in said third receptacle.

References Cited by the Examiner

UNITED STATES PATENTS

| | | | |
|---|---|---|---|
| 865,955 | 9/1907 | Sokup | 100—268 |
| 969,720 | 9/1910 | Pickett | 100—218 |
| 1,040,396 | 10/1912 | Paal | 100—218 |
| 1,172,400 | 2/1916 | Specht et al. | 100—268 XR |
| 2,008,592 | 7/1935 | Paxton | 100—218 XR |
| 2,700,333 | 1/1955 | Polsen et al. | 100—295 XR |
| 2,800,159 | 7/1957 | Walsh et al. | 100—53 |
| 2,817,290 | 12/1957 | Parker et al. | |
| 2,916,985 | 12/1959 | Beach | 100—53 |
| 2,962,959 | 12/1960 | Sholin | 100—295 XR |
| 2,982,200 | 5/1961 | Robertson et al. | 100—53 |
| 2,986,992 | 6/1961 | Patros et al. | 100—218 |
| 3,106,888 | 10/1963 | Chapleau | 100—295 XR |

FOREIGN PATENTS

| | | |
|---|---|---|
| 911,766 | 7/1961 | Great Britain. |

WALTER A. SCHEEL, *Primary Examiner.*

CHARLES A. WILLMUTH, *Examiner.*